Patented Aug. 24, 1954

2,687,411

UNITED STATES PATENT OFFICE 2,687,411

PRODUCTION OF WATER SOLUBLE CELLULOSE ETHERS

Thomas J. Higgins, Jr., Fredericksburg, Va., assignor to American Viscose Corporation, Philadelphia, Pa., a corporation of Delaware No Drawing. Application March 15, 1952, Serial No. 276,881

7 Claims. (Cl. 260—232)

This invention relates to cellulose ethers and has as its object the production of such ethers which are soluble in water.

This application is a continuation-in-part of application Serial No. 85,730, filed April 5, 1949, now abandoned.

It is known to produce water-soluble cellulose ethers by a process which involves converting cellulose or alkali cellulose into a low etherified cellulose ether soluble in alkali, and then continuing the reaction until a water-soluble ether is obtained. The isolation and purification of the resulting water-soluble ether are complicated by its solubility in water, and require the use of comparatively expensive organic solvents, dialysis, or other special treatment.

It is also known to produce water-soluble ethers from a previously prepared low-substituted water-insoluble, alkali-soluble ether by dissolving or dispersing said low-substituted ether in caustic soda, and adding an alkylating agent to the solution to produce a water-soluble product. Here again, precipitation of the product from the mass and purification thereof are complicated by the fact that the product is soluble in water and cannot be isolated or purified by means of water.

Accordingly, it is a general object of the present invention to provide a new process for producing water-soluble cellulose ethers whereby the ethers are obtained directly in substantially pure condition and special precipitating and purifying treatments are eliminated. Another object is to carry out the etherification to produce the water-soluble ethers in a more economical manner. Other objects will appear hereinafter.

In the practice of the present invention it has been discovered that substantially pure water-soluble cellulose ethers can be produced directly by wetting a fibrous mass consisting of a low-substituted water-insoluble, alkali-soluble cellulose ether with an aqueous alkaline solution having an alkali concentration below the concentration required to disperse or dissolve the ether, and treating the wetted mass with an alkylating agent until the water-soluble ether is obtained.

In the now preferred embodiment, the method of the present invention, comprises wetting a dry fibrous mass consisting of the low-substituted cellulose ether with an alkaline liquid consisting of an aqueous solution of an alkali metal hydroxide in a concentration below the concentration at which the ether is dissolved or dispersed, adding to the moist pulpy mass thus obtained an etherifying agent selected from the class consisting of alkylating, hydroxy-alkylating, and carboxy-alkylating agents, while controlling the temperature so that it remains at from 18 to about 30° C., continuing the reaction at that temperature until the moist pulpy mass is converted to a mass comprising a water-soluble ether, and thereafter partially, substantially completely, or completely neutralizing the alkali catalyst by converting it to a water-soluble salt which remains as a harmless constituent of the mass.

The mass may be dried for storage or shipping, or water may be added directly to the mass to produce an aqueous solution of the ether for use.

In the practice of the present invention, the water soluble cellulose ethers are produced from low-etherified alkali-soluble, water-insoluble cellulose ethers and methods for the production of such starting materials are well known in the art. For the production of such starting material there may be used cellulose in any of its natural forms and cellulose conversion products such as oxycellulose, hydroxy cellulose, and cellulose hydrates of all kinds. The low-etherified cellulose ether used as starting material in the present process may be an alkyl ether, a hydroxy-alkyl ether, a carboxy-alkyl ether, or a mixed cellulose ether and may be soluble in aqueous alkali solutions of almost any concentration provided there is some lower limit of alkali concentration below which the ether is insoluble. However, in the preferred embodiment, the starting cellulose ether is soluble in alkali solutions having a concentration of 3% or more and when such ethers are used, aqueous alkaline solutions having a concentration of less than 3% down to 0.5% (i. e. a concentration at which the ether is not dissolved or dispersed) are used in carrying out the reaction. The etherifying agent added to the moist pulpy mass comprising the water-insoluble, alkali-soluble ether which is wetted with the aqueous alkaline solution in accordance with this invention may be, for example, any one of the following: as alkylating agents alkyl esters of inorganic acids, for example, dimethyl sulfate, diethyl sulfate, methyl sodium sulfate and the like, and alkyl halides, e. g., methyl chloride, ethyl chloride, methyl bromide, ethyl bromide, and the like; as hydroxy-alkylating agents, the alkylene oxides e. g. ethylene oxide, propylene oxide, glycides and the like, and halohydrins such as ethylene chlorhydrin, propylene chlorhydrin, glycerine chlorhydrin, epichlorhydrin and the like; and as carboxy-alkylating agents, chloracetic acid, chloropropionic acid, sodium chloracetate, chloracetamide, and the like. The expression "cellulose ether" is intended to include simple alkyl ethers, hydroxy-alkyl ethers, carboxy-alkyl ethers, mixed alkyl hydroxy-alkyl ethers, mixed alkyl carboxy-alkyl ethers, and the salts of the carboxy-alkyl ethers.

The etherifying reaction is preferably carried out by wetting the dry fibrous mass comprising the low etherified cellulose ether with an aqueous solution of a strong inorganic alkali, such as lithium, sodium or potassium hydroxide.

It will be understood that in the present process the aqueous alkaline solution of reduced concentration serves two important functions. The solution serves as a wetting medium for the fibrous mass comprising the low-etherified ether, and the alkali compound in said solution serves as a condensing agent or catalyst for the further etherification of the cellulose to the water-soluble stage. The starting low-substituted cellulose ether is not dissolved or dispersed at any time during the reaction. It is preferred to add the etherifying agent to the moist pulpy mass comprising the low-etherified cellulose ether wet with the aqueous alkaline solution in small quantities over a period of several hours with constant mixing of the mass, with or without pressure, while maintaining the temperature at about 15 to 30° C., and to then allow the mixture to age at a temperature of from 15 to 30° C. until the water-soluble ether has been produced, as determined by solubility tests on samples removed periodically. When the alkylating agent is volatile or gaseous, the reaction is carried out in a closed vessel which is preferably evacuated prior to the addition of the etherifying agent. When the mass has been homogeneously converted to a moist fibrous or pulpy mass comprising the water-soluble ether, the catalyst is neutralized, for example by the addition of carbon dioxide, an alkali metal salt of a polycarboxylic acid having at least one free carboxyl group, such as sodium acid citrate or sodium acid tartrate, a reactive organic carboxy acid, or an inorganic acid salt such as a phosphate, sulfate, etc., to produce a mass comprising the ether and a salt. For instance, the small amount of sodium hydroxide present in the mass comprising the water-soluble ether may be converted to sodium carbonate by the addition of carbon dioxide to produce a mass comprising the water-soluble cellulose ether and sodium carbonate in an amount not greater than about 1.5% by weight.

The number of ether groups for each unit of cellulose ($C_6H_{10}O_5$) which must be introduced into the starting low-etherified alkali-soluble, water-insoluble cellulose ether in order to convert it to a water-soluble ether will depend upon the nature of the etherifying agent used and other factors well-known to the art. Generally speaking, less hydroxy-alkyl or carboxy-alkyl groups are required than of alkyl groups to produce an ether which is soluble in cold water and insoluble in hot water.

By way of illustrating but in no way limiting the invention the following specific examples are set forth in which the parts are by weight:

*Example I*

A dry fibrous mass consisting of 100 parts of a water-insoluble, alkali-soluble hydroxyethyl cellulose ether soluble in a 3% aqueous solution of sodium hydroxide at 20° C. was mixed in a shredder with 150 parts of 0.3% aqueous sodium hydroxide solution (2.5 parts of 19% NaOH and 147.5 parts of water) and 0.6 part of Tergitol 08, (a commercial product comprising a 40% solution of the sodium salt of the sulfate of 2-ethyl hexanol.) The mass was mixed for one hour at 18 to 20° C. The mixture, consisting of a moist pulpy mass, was removed from the shredder and placed in a churn which was evacuated to about 30 inches vacuum. Fifty parts of ethylene oxide were added over a period of 3 hours, the temperature of the mass being held at 15 to 18° C. The reaction was allowed to continue at 15 to 18° C. for 17 hours. The sodium hydroxide was then converted to the corresponding carbonate by the addition of 2 parts of carbon dioxide. The moist fibrous mass was removed from the shredder and dried. The product dissolved in water at 20° C. By analysis, the product was found to contain 0.9% by weight of sodium carbonate.

*Example II*

A dry fibrous mass consisting of 50 parts of a low-etherified water-insoluble hydroxyethyl cellulose ether soluble in a 3% aqueous sodium hydroxide solution at 20° C. was mixed in a shredder with 67 parts of 0.4% caustic soda solution and 0.6 part of Tergitol 08. The mixture was shredded for 0.5 hour, the temperature being controlled at 15 to 20° C. The mass was removed from the shredder and placed in a baratte, which was evacuated to about 30 inches vacuum. Thirty parts of ethylene oxide were added over a period of 6 hours, and the reaction was allowed to proceed for 18 hours at 18 to 30° C. The sodium hydroxide was then converted to the corresponding carbonate by the addition of 2 parts of carbon dioxide, and the product was dried, to produce a fluffy fibrous mass which was soluble in water. On analysis, the product was found to analyze 0.815% ash as carbonate.

*Example III*

An air dry (6% moisture) fibrous mass consisting of 50 parts of a low etherified water-insoluble hydoxyethyl cellulose ether soluble in a 3% aqueous solution of sodium hydroxide at 20° C. was mixed in a shredder with 75 parts of 0.75% caustic soda solution and 0.6 part of Tergitol 08 for 0.5 hour at 18 to 23° C. The mass was removed from the shredder and placed in a baratte which was evacuated to about 30 inches of vacuum. Thirty parts of ethylene oxide were added, and the reaction was continued for 16 hours at a temperature of 20 to 30° C., at which time the product was found to be soluble in water. The sodium hydroxide was then converted to the carbonate by the addition of 4 parts of carbon dioxide. The product was removed from the baratte and dried in a vacuum oven. The dried product, a fluffy fibrous mass, was soluble in water and, on analysis. was found to analyze 1.43% ash as carbonate.

The production of water-soluble cellulose ethers from low-etherified alkali-soluble, water-insoluble ethers in accordance with the present invention, has many important advantages, including the outstanding advantage that the water-soluble ether is produced directly in pure or substantially pure and useable condition and the isolation and purification treatments necessary for water-soluble ethers produced by the prior art processes are entirely eliminated.

Since certain changes and modifications may be made in carrying out the above process without departing from the scope of the invention it is intended that all material contained in the above description shall be interpreted as illustrative and not in a limiting sense.

I claim:

1. A method for making water-soluble cellulose ethers which comprises wetting a dry fibrous mass comprising a low-etherified water-insoluble, alkali-soluble cellulose ether, which is soluble in aqueous alkali solutions of at least 3% concentration, with an aqueous solution of an alkali metal hydroxide having a concentration less than 3% down to 0.5% to form a moist fibrous mass, slowly adding an etherifying agent selected from the class consisting of alkylating, hydroxy-alkylating, and carboxy-alkylating agents in small amounts over a period of 3 to 6 hours to the moist fibrous mass thus obtained while maintaining the temperature at from 15° to 30° C., allowing the mixture of the moist fibrous mass and the etherifying agent to stand at a temperature of from 15° to 30° C. until the water-soluble ether is produced, and then neutralizing the small amount of alkali metal hydroxide contained in the mass.

2. The method of claim 1, wherein the dry fibrous mass comprising the low-etherified water-insoluble, alkali-soluble cellulose ether is wetted with an aqueous solution of sodium hydroxide.

3. The method of claim 1, wherein the etherifying agent added to the fibrous mass wet with the aqueous alkaline solution is ethylene oxide.

4. The method of claim 1, wherein the low-etherified water-insoluble, alkali-soluble cellulose ether is wetted with an aqueous solution of sodium hydroxide, ethylene oxide is added to the wet fibrous mass to convert the ether to the water-soluble form, and carbon dioxide is added to the mass to neutralize the small amount of alkali metal hydroxide contained therein, and to produce a mass comprising the water-soluble ether and sodium carbonate.

5. A method for making water-soluble cellulose ethers which comprises wetting a dry fibrous mass comprising a low-etherified water-insoluble, alkali-soluble hydroxyethyl cellulose ether, which is soluble in aqueous alkali solutions of at least 3% concentration, with an aqueous solution of sodium hydroxide having a concentration less than 3% down to 0.5% to form a moist fibrous mass, slowly adding a hydroxy-alkylating agent in small amounts over a period of 3 to 6 hours to the moist fibrous mass thus obtained while maintaining the temperature at from 15 to 30° C., allowing the mixture of the moist fibrous mass and the hydroxy-alkylating agent to stand at a temperature of from 15 to 30° C. until the water-soluble hydroxyethyl cellulose ether is produced, and then neutralizing the small amount of sodium hydroxide contained in the mass.

6. The method of claim 5, wherein the hydroxy-alkylating agent added to the fibrous mass wet with the aqueous sodium hydroxide is ethylene oxide.

7. The method of claim 5, wherein the small amount of sodium hydroxide contained in the mass is converted to sodium carbonate by the addition of carbon dioxide.

References Cited in the file of this patent

UNITED STATES PATENTS

| Number | Name | Date |
|---|---|---|
| 2,388,764 | Reichel et al. | Nov. 13, 1945 |
| 2,447,757 | Lilienfeld | Aug. 24, 1948 |